United States Patent [19]
Fehlner et al.

[11] 3,947,849
[45] Mar. 30, 1976

[54] LORAN RECEIVER-NAVIGATOR
[75] Inventors: Leo F. Fehlner, Silver Spring; Thomas W. Jerardi, Columbia; Ronald G. Roll, Silver Spring, all of Md.
[73] Assignee: The Johns Hopkins University, Baltimore, Md.
[22] Filed: June 20, 1974
[21] Appl. No.: 481,409

[52] U.S. Cl.............................. 343/103; 235/150.272
[51] Int. Cl.[2]............................................ G01S 1/20
[58] Field of Search....................... 343/103, 105 R; 235/150.272

[56] References Cited
UNITED STATES PATENTS
3,375,520   3/1968   De Groot et al..................... 343/103
3,868,691   2/1975   Miller et al. ......................... 343/103

Primary Examiner—T. H. Tubbesing
Assistant Examiner—Richard E. Berger
Attorney, Agent, or Firm—Robert E. Archibald

[57] ABSTRACT

An integrated receiver and navigation instrument receives RF navigation signals and performs hyperbolic coordinate conversions utilizing a specially programmed computer to control the measurement modes and sequences and to improve the accuracy of the navigational information produced. An RF unit processes the incoming signal for use by a Digital Measurement unit which makes digital measurements at preselected points on the incoming signal waveform, and which can operate in various modes. The specially programmed computer controls the operating modes of the Digital Measurement unit, performs coordinate conversions, and provides navigational information using various parameters obtained in the receiver section of the instrument. The Digital Measurement unit modes permit a search for a desired signal, positioning of the measurement points on the signal and continuous tracking of the signal.

15 Claims, 11 Drawing Figures

LORAN RECEIVER-NAVIGATOR

STATEMENT OF GOVERNMENT INTEREST

The invention herein described was made in the course of or under a contract or subcontract thereunder, with the Department of the Navy.

BACKGROUND OF THE INVENTION

Loran-C is a well-known, long-range, high-power, precision navigation system employing automatic envelope detection and radio frequency cycle comparison techniques. A Loran-C chain consists of one master and at least two secondary transmitters, with each individual chain being identified by a specific group repetition interval (GRI). The signals which are radiated by the transmitters are pulsed electrical signals that are very accurately timed, and phase coded for identification. These signals are propagated both as groundwaves and as skywaves reflected from the ionosphere. The standard measurement technique consists of measuring the times of arrival of signals from two secondary transmitters, A and B, relative to the time of arrival of the signal from a third transmitter M (master). These two time differences TDA and TDB identify two hyperbolas that intersect at the receiving antenna. The precision of position location available from Loran service may then be seen to be dependent upon the precision of the time difference measurements. However, while the need for measurement accuracy may seem obvious a further requirement is speed of measurement. When Loran is being used for marine navigation there is a relatively large amount of time in which to acquire the signals and perform the measurements, but when Loran is being used for aircraft navigation the high speed makes rapid signal acquisition and speedy measurement taking a necessity.

When used on high-speed aircraft it is probable that the flight will pass through any number of Loran triads and chains. Triads are referred to because three transmitters are required to produce the two hyperbolic lines of navigation. A further system limitation currently exists because, since present Loran receivers operate on only one group repetition interval at one time, all three transmitters must be members of the same Loran chain. Also, most present receivers require the master transmitter to be a member of each triad.

BRIEF DESCRIPTION OF THE INVENTION

The present Loran Receiver/Navigator comprises three major units; the Radio Frequency Unit (RFU), the Digital Measurement Unit (DMU) and the Computer, Control and Display Unit (CCDU). The basic function of the Radio Frequency Unit is to process the incoming Loran signal so that the signal is available to the Digital Measurement Unit at a specified voltage level and with negligible distortion. The RF Unit also provides cancellation of continuous wave interference without distorting the desired Loran signal.

The Digital Measurement Unit performs the conversion of analog voltage measurements, made at preselected points on the waveform received by the RFU, into binary form. The DMU further serves to control measurement sequences and the transfer of data into the navigation computer. The DMU operates in three different modes; Search, Settle, and Track. When operating in the Search mode, the binary data are preprocessed prior to transfer to the computer, while in all other modes data are transferred directly. The DMU can provide navigation measurements using only three transmitters, none of which is a master transmitter.

The Computer, Control and Display Unit consists of a digital computer and its associated input/output interfaces. These interfaces are of two types; a control/indicator interface provides the human interface, and the guidance and control subsystems provide guidance displays, autopilot signals, etc. The computer contains the software programs embodying the receiver and navigation functions, as well as the overall control program.

It is therefore an object of the invention to provide an integrated receiver and navigation instrument performing hyperbolic coordinate conversion for rapidly producing accurate navigation information.

It is another object of the invention to provide a receiver-navigator instrument utilizing a specially programmed computer to control the operation of the instrument, to perform coordinate conversions, and to provide navigational information using various parameters obtained from the receiver.

It is a further object of the invention to provide an integrated receiver-navigator utilizing Loran signals and having a digital measurement unit under the control of a specially programmed computer.

It is still a further object of the invention to provide an integrated Loran receiver-navigator utilizing a specially programmed computer to control measurement modes and sequences and to perform coordinate conversions for producing navigation information.

DESCRIPTION OF THE PREFERRED EMBODIMENT

Figure 1:
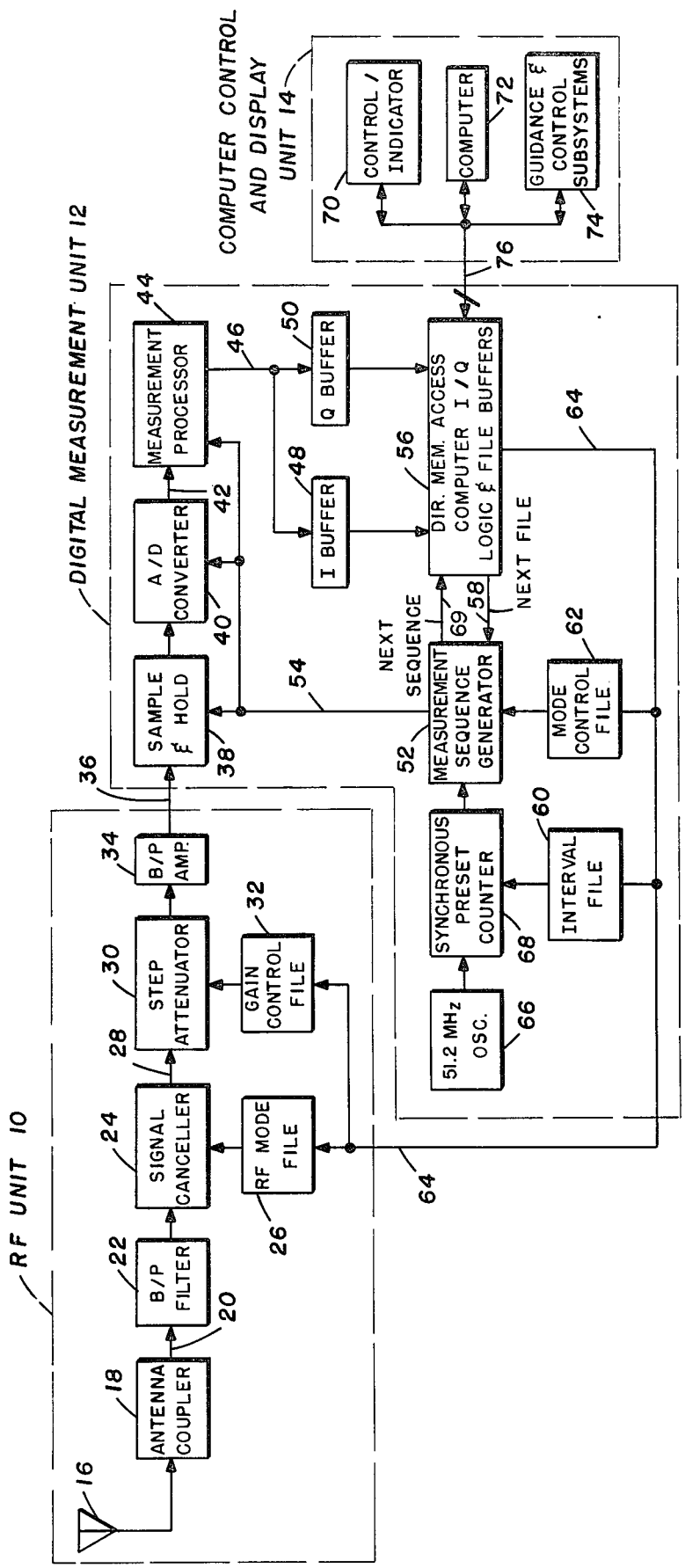
FIG. 1 shows the preferred embodiment of the present receiver/navigator in block diagram form.

Referring now to FIG. 1, the receiver/navigator system of the present invention is shown in block diagram form. The system is divided into three major units; the RF Unit 10, the Digital Measurement Unit 12 and the Computer, Control and Display Unit 14. Loran signals are received by a conventional antenna 16 and are applied to an antenna coupler 18 where they are amplified with only a small amount of filtering. The antenna coupler 18 output signal is suitable for driving a balanced low impedance transmission line 20. Therefore, the antenna coupler 18 can be located near the antenna 16 and signals will be transferred to the receiver section on line 20 without loss or interference by local undesired signals. The signal is then fed to a bandpass filter 22 which provides attenuation of undesired signals which are outside of the Loran-C signal bandwidth.

The received signal is then fed to a signal canceller unit 24, which may be of the type described and claimed in copending patent application Ser. No. 477,410 filed June 7, 1974, now U.S. Pat. No. 3,916,320, having a common assignee with the present invention. The signal canceller 24 is a phase lock device which attenuates undesired signals within the Loran-C signal bandwidth. When a command to operate is received through an RF mode file 26 from a computer located in the Computer Control and Display Unit 14, the signal canceller 24 automatically searches for continuous wave or frequency shift keyed signals and phase locks to the first signal encountered. The phase lock loop output signal is adjusted to the proper amplitude and added out-of-phase to the undesired input signal, thereby producing attenuation through cancellation.

The received Loran signal on line 28 is unaffected by the signal canceller 24 and is fed to a step attenuator 30. The step attenuator 30 sets the overall gain of the radio frequency unit 10 by attenuation of the received signal. The attenuator setting is controlled again by the computer of the computer control unit 14 through a gain control file 32. The step attenuator 30 is a very wide bandwidth device producing extremely small signal phase shift over a large attenuation range. The signal is then fed to a bandpass amplifier 34 which is a fixed gain device which provides the majority of the RF unit 10 signal amplification. The output of the bandpass amplifier 34 on line 36 is suitable for driving the digital measurement unit 12. THe bandpass amplifier 34 also serves to provide additional attenuation of undesired signals which are outside of the Loran-C signal bandwidth.

The signal produced by the RF unit 10 on line 36 is now fed through a sample and hold device 38 to an analog/digital converter 40. The digitizing portion of the measurement unit 12 consists of the sample and hold device 38 which selects and holds an analog voltage sample point value, and a ten-bit analog-to-digital converter 40 which converts the sample point value to a negative two's complement binary number on line 42. The signal on line 42 is passed through a measurement processor 44 which is designed for conventional pipe line synchronous preprocessing in the Search mode, and is shown in more detail in FIG. 6. The output signal on line 46 of the measurement processor 44 is transferred to either of two buffer registers, an I buffer register 48 or a Q buffer register 50. The I buffer register 48 is for the in-phase voltage component and the Q buffer register 50 is for the quadrature voltage component. The names do not literally apply until sample point timing adjustments make Q (quadrature voltage) values small and I (in-phase voltages) values large in an absolute sense.

Figure 7:
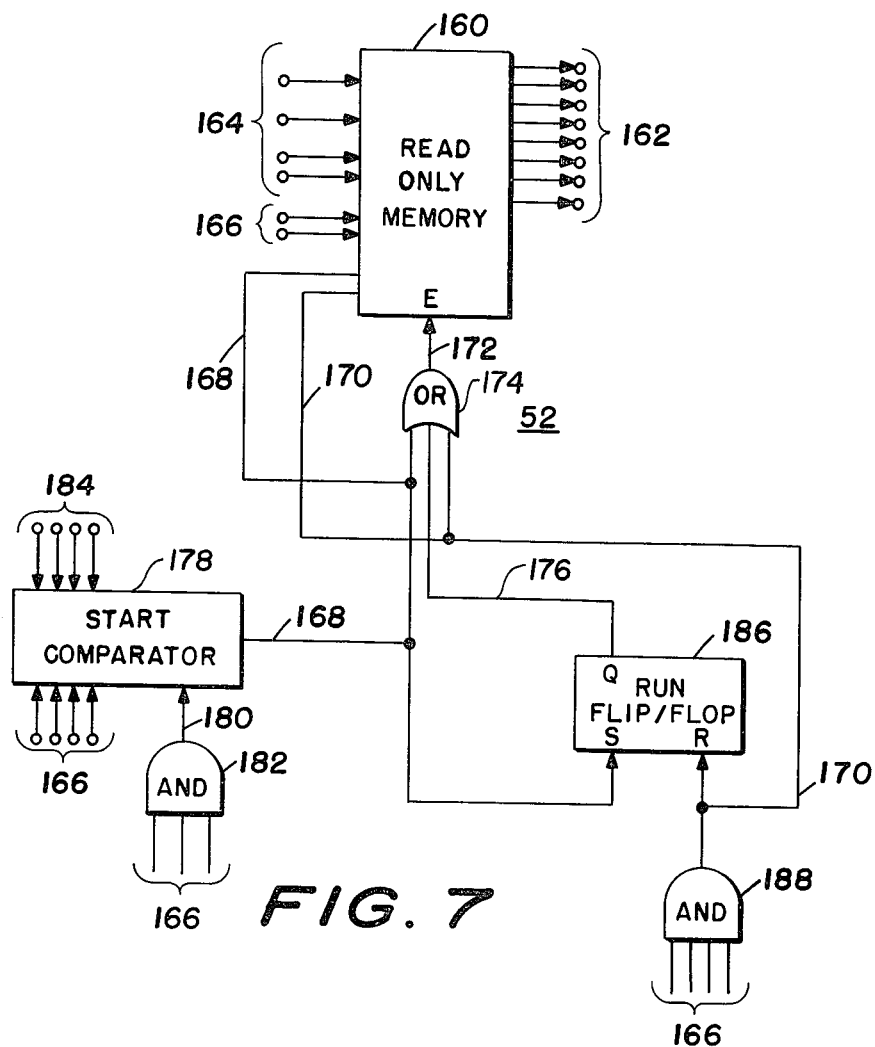
FIG. 7 is a block diagram of the measurement sequence generator of the preferred embodiment.

After each measurement sequence a signal is produced by a measurement sequence generator 52, shown in more detail in FIG. 7, on line 54 which permits the I buffer 48 and the Q buffer 50 to fill, and a direct memory access computer input-output logic and file buffers unit 56 transfers the contents of the I buffer 48 and the Q buffer 50 to a preselected table in the computer memory located in the computer control unit 14. When the table in the computer memory is filled, a counter in the direct memory access logic 56 which was preset by the navigation computer program, overflows and signals the end of a measurement sequence group file by a signal appearing on line 58 which is fed to the measurement sequence generator 52. Each file contains a group of up to four measurement sequences. At this time the next measurement file words are transferred from the file buffers located in the direct memory access computer input/output logic and file buffers unit 56 to the RF mode file 26, the gain control file 32, an interval file 60, and sequence mode control file 62 by a signal on line 64. The transfer of the file words from the file buffers 56 to the file registers 26, 32, 60, 62 initiates a new group of measurement sequences. Simultaneously an interrupt is sent to the computer section 14, signalling that the preselected measurement tables for the preceeding group file are now filed in the computer memory, the current sequence group file is in progress, and the computer program must fill the file buffers for the next sequence group.

Timing is provided by a 51.2 MHz crystal oscillator 66. The 51.2 MHz frequency is chosen to give the optimum interface between a 16-bit synchronous preset counter 68 and the computer Search, Settle and Track routines which calculate in binary the numbers for the synchronous preset counter 68 which is shown in more detail in FIG. 8.

The measurement sequence generator 52 provides the control and clock signals on line 54 to the sample and hold circuit 38, the analog-to-digital converter 40 and the measurement processor 44. The measurement sequence generator 52 also signals the direct memory access computer input/output logic and file buffers 56 on line 69 when the end of one measurement sequence and the beginning of the next measurement sequence has occurred, thereby sending the contents of the I buffer 48 and the Q buffer 50 to the computer memory. At the end of a measurement sequence, the next mode word in the mode file is selected by the measurement sequence generator 52 and the next interval word is inserted into the synchronous preset counter 68 thereby beginning a new measurement sequence.

The digital measurement unit 12 is controlled by the computer/control unit 14 which comprises a control/indicator 70, a computer 72 and a guidance and control subsystem unit 74, all of which communicate with the digital measurement unit 12 via multiple lines shown at 76. The computer 72 is a 16-bit digital processor having a direct access memory unit. The control/indicator 70 operates to permit the operator to exercise control over the entire navigator-receiver system. It accepts inputs from the operator and indicates the status of the system, as well as specific data requested by the operator. The guidance and control subsystems 74 are dependent on the type of aircraft or ship using the receiver-navigator, i.e., the type of autopilot or the type of guidance computer in use.

Figure 2:
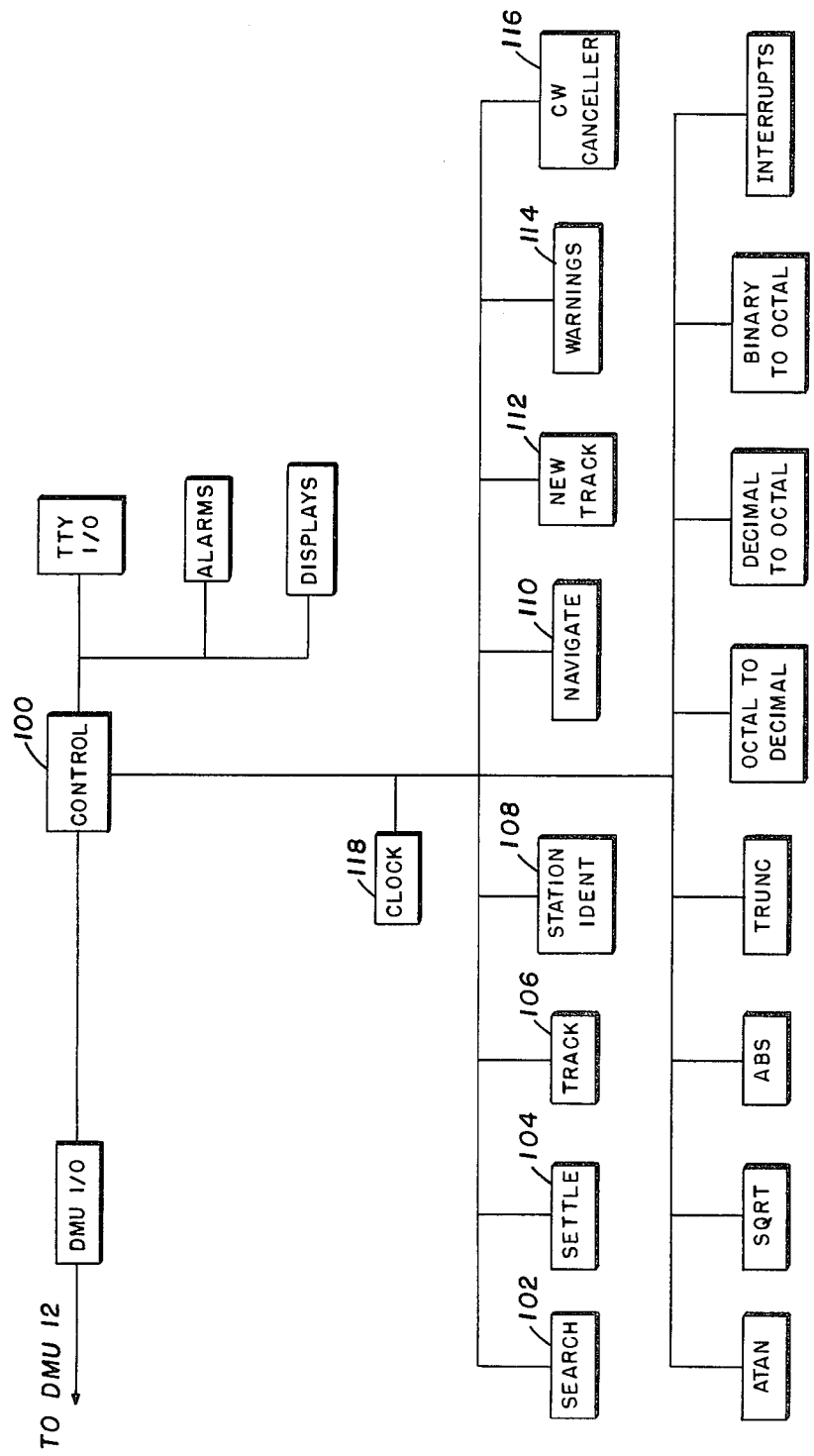
FIG. 2 is a block diagram of the computational software used in the computer of the preferred embodiment of FIG. 1.

All of the Loran receiver-navigator functions, except those performed by the radio frequency unit 10 and the digital measurement unit 12, are embodied in a program of computation and logic instructions. The computer 72 of the computer/control unit 14 contains this program, a block diagram of which is shown in FIG. 2. The total program is divided into various subroutines and an overall control program 100. The subroutines include the following: Search 102, Settle 104, Track 106, Station Identification 108, Navigate 110, New Track 112, Warnings 114, and the subroutine 116 used to operate the signal canceller 24 of FIG. 1. Referring to FIG. 2, the Control Program 100 serves to call the particular subroutine to be executed, and to specify the initial conditions of such subroutine. It also accepts and stores the initial conditions imposed by external sources and monitors lists of data pertinent to the various functions being executed, e.g., a file of stations in track together with pertinent data. The Control Program 100 also generates signals used to control the signal canceller 24, the step attenuator 30 and the Digital Measurement Unit 12, all shown in FIG. 1. The signal canceller may exist in three modes: off, on with Loran signals present, and on with Loran signals not present. The on or off modes will be based on analysis of data rejected by the Track subroutine 106, and the two "on" states will be controlled by the Digital Measurement Unit, 12 of FIG. 1. The step attenuator is controlled by the Control Program 100 in accordance with an anticipated value of the in-phase component (I) of each signal which is in track. The Control Program 100 also serves to specify the mode of the Digital Measurement Unit 12 of FIG. 1 and to position the measurement gates for each signal in track, based on an estimate of the time of arrival of the next signal.

The first subroutine to be called by the Control Program 100 is the Search subroutine 102. This subroutine serves to detect and locate the Loran pulse groups having the required Group Repetition Interval (GRI) with respect to a local clock 118. Whenever Search has located one of the desired Loran pulse groups, the Settle subroutine 104 is called for and initiated with respect to that group. The Settle subroutine 104 serves to identify the groundwave and the desired cycle to be tracked, and adjusts the timing of the measurement sequence generator 52 of FIG. 1, to establish tracking of the zero crossing of the cycle to be tracked. The Track subroutine 106 serves to edit raw data with respect to both in-phase (I) and quadrature (Q) components. If the value of either I or Q of a related pair violates a predetermined criterion of acceptability, the IQ pair will be rejected. The initial criterion of acceptability at the time the receiver is turned on will be somewhat lower than the steady-state criterion. Subsequently, this criterion will be adjusted based on an assessment of the immediate past performance of the receiver.

It has been found through experimentation and analysis that noise in the Loran bandwidth is not Gaussian. It is then reasonable to conclude that an assumption of Gaussian noise as the basis for optimization of tracking loop parameters is not valid. Consequently, the Track subroutine 106 incorporates non-linear time domain filtering of the inputs to the tracking loops to effectively cope with noise. When called by the Control Program 100, the Track subroutine 106 produces the best estimates of the time of arrival of the Loran signal.

The Station Identification subroutine 108 is called into play when three or more signal tracks are established. It serves to label each track with a standard designator indicating that the signal originates from a specific station. These stations may be identified by the letters, M, U, V, W, X, Y, Z, where M is the master and the remaining letters signify secondary stations in the chain. Identification is based on a comparison of the receiver's known initial or updated position and its position as computed from the measured time differences.

The Navigate subroutine 110 performs the required mathematical calculations, using the time difference data, necessary for horizontal navigation. Navigation is accomplished by steering a preselected course with the aid of computed cross track error and its time rate, along track distance and its time rate, and also the heading error. The time differences for the Loran transmitters designated by the Control Program 100 for navigation will also be computed. These time differences will then be adjusted so as to apply to the simultaneous arrival of signals from all transmitters.

As the receiver/navigator travels through a Loran chain, signals which are in track will necessarily fade. When called for by the Control Program 100, the New-track subroutine 112 will position the Settle subroutine 104 sample points on the stations of the chain which are not in track, thereby replacing stations which have faded with those which may be tracked.

The Warnings subroutine 114 serves to produce signals indicating various system malfunctions, such as Jamming, Skywave, Internal Malfunction, or Transmitter Malfunction. As mentioned previously the Signal Canceller subroutine 116 determines the state of the signal canceller 24 located in the RF unit 10. Moreover, after the Settle subroutine 104 has been completed the Signal Canceller subroutine 116 commands the signal canceller to ignore any further input signals during Loran pulse reception. In other words, once the signal canceller is phase-locked onto the interfering signal it performs its cancelling function in a manner which is synchronized to the Loran pulse occurrence through signals which are originated by the Signal Canceller subroutine 116.

As will be obvious to a person having ordinary skill in the art, the various subroutines employed in the illustrated embodiment of the present invention may be implemented in different ways depending upon the requirements of practice. Accordingly, in order to simplify the disclosure of the invention, but at the same time render it sufficient for a person of ordinary skill in the art, a detailed description of the various subtasks involved in each subroutine will be presented.

Figure 3A:
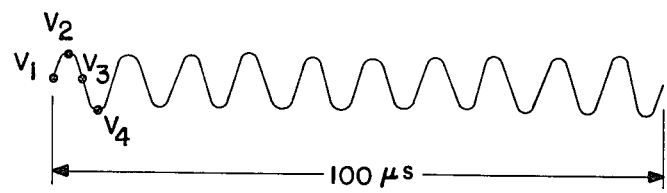
FIGS. 3a, 3b and 3c are plots of the three data input modes required by the preferred embodiment of FIG. 1.
Figure 4A:
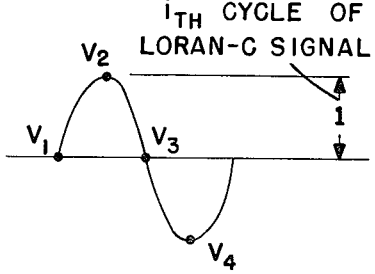
FIGS. 4a and 4b are respectively plots of a typical cycle of search data before and after preprocessing preparatory to being fed to the computer of the preferred embodiment.

As mentioned previously, the task of the Search subroutine 102 is to detect Loran pulse groups in the data measured by the Digital Measurement Unit 12 of FIG. 1; and to locate in time the groups in the Group Repetition Interval (GRI). In order to achieve this task, there are five subtasks which must be performed. These five subtasks are:

1. Detect a Loran pulse.
2. Detect a pulse group (at least six pulses of the eight available must be detected).
3. Detect and identify the Loran pulse group phase code.
4. Detect the absence of cross rate interference, i.e., two pulse groups in time proximity but moving with respect to each other.
5. File data pertinent to the new pulse group detection. When any one of these five subtasks cannot be completed, or when all five are completed, program control is returned immediately to the Control Program 100. Upon successful completion of these subtasks, the Search subroutine 102 assigns a table of values for that detected pulse group in preparation for the execution of the subsequent subroutines. The data input to Search consists of two data points from the Digital measurement Unit every 100 microseconds. This is illustrated on the voltage waveform of FIG. 3a. The data points consist of one I and one Q value of the Loran signal components and are identified as I data (amplitude) and Q data (phase). The voltage values at $V_1$, $V_2$, $V_3$, and $V_4$ of FIG. 3a are preprocessed in the Digital Measurement Unit to provide an in-phase and quadrature data input to the Search subroutine every 100 microseconds. The location of the data points are also shown in FIG. 4a. The data are preprocessed in accordance with the equations:

$$I_i = V_1 + V_2 - V_3 - V_4$$
$$Q_i = V_1 - V_2 - V_4 + V_3.$$

Figure 4B:
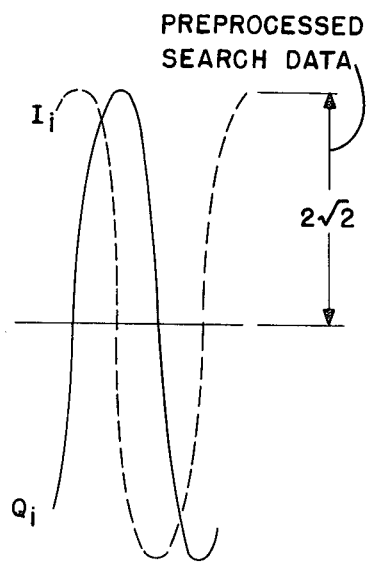

The resultant preprocessed waveforms are shown in FIG. 4b. The Search subroutine supplies two data words to the direct memory access portion of the computer every 100 microseconds, however, data transfer may also take place at the rate of four data words every 200 microseconds or six data words every 300 microseconds, etc. Each pair of input values (an I and a Q) is subjected to the first subtask, i.e., pulse detection. If the data fail this subtask, a zero is stored in the I portion of the memory and a zero is stored in the Q portion of the memory, and control is passed immediately back to the Control Program. If the data pass this test, the I and Q values are stored in the memory. Upon successful completion of this first subtask, the second subtask begins and examines the I and Q memory portions in order to find at least six of the eight pulses in a pulse group. If six pulses of the pulse group are not found, program control is again passed back to the Control Program. When six or more pulses in a pulse group have been detected, subtask 3 tests each detected pulse to ascertain if the group consists of a master pulse group (phase code interval GRI-A or GRI-B), a secondary pulse group (phase code interval GRI-A or GRI-B), or none of these.

As is well known, a Loran-C pulse group consists of eight phase-coded pulses from any secondary transmitter or nine from a master transmitter. Phase coding consists of inverting the phase of the RF cycle relative to the transmitter frequency standard on a pulse to pulse basis in accordance with a standardized code pattern. During one Group Repetition Interval, Loran-C transmits the GRI-A phase code; then during the next GRI, the GRI-B phase code, then the A phase code, etc. Referring once again to subtask 3, if the pulse group does not fall within one of the four categories, program control is returned immediately to the Control Program 100. Upon successfully passing the phase code test, subtask 4 performs a cross rate test to make sure that the two consecutive pulse group detections are really not two different transmitters with different GRIs. Only if the two detections occur at the same time in the GRI and are of opposite phase code can this test be passed. As before, failing this test control is returned immediately to the Control Program 100. Subtask 5 tests the pulse group detection time of the GRI. If the time of occurrence is within plus or minus 200 microseconds, the second pulse group is ignored and control of the program returns to the Control Program 100. Failing this test, all pertinent data are stored in the track table in chronological order within the local Group Repetition Interval, and control then returns to the Control Program 100.

Figure 3B:
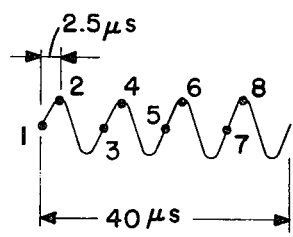
Figure 3C:
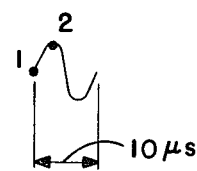
Figure 5:
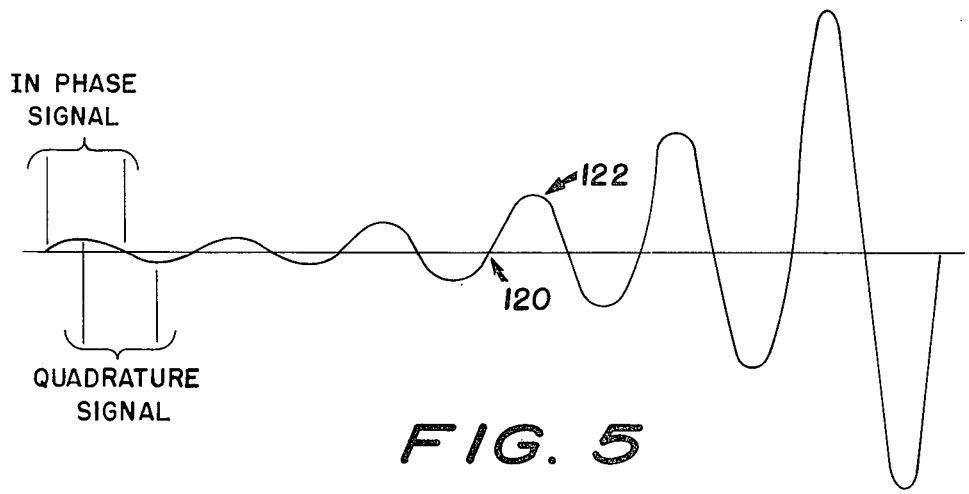
FIG. 5 is a waveform of a single Loran-C pulse.

The next subroutine to be called by the Control Program 100 is the Settle subroutine 104. The purpose of Settle is to position the two Track data sample points at preselected time positions on the Loran pulse. For Loran-C these preselected time positions are 30 and 32.5 microseconds into the Loran pulse. To accomplish this purpose, the Settle subroutine 104 moves a group of eight data sample points, which had initially been positioned by the Search subroutine 102, forward or backward on the pulse. These points are so moved until the sample points are located on the first four cycles of the pulse. This is shown in FIG. 3b. The position in time of the third cycle is then transmitted to the Track subroutine 106 which then continues to position its pair of data sample points so that one of the pair precisely tracks the zero crossing at the end of the third cycle of the pulse. FIG. 5 shows a single Loran pulse with the zero crossing of the third cycle indicated at 120. The other data point of the pair samples the amplitude of the positive half cycle of the fourth cycle and is indicated at 122.

In order to perform the task of the Settle subroutine, six subtasks are involved. These are:
1. Remove the Loran pulse group phase code.
2. Check the in-phase (I) data for consistency within a selected tolerance.
3. Check the quadrature (Q) data for consistency within the same selected tolerance.
4. Sum both paired sets of four sample voltages over all accepted pulses.
5. Compare the summed, squared data to detect the leading edge of the pulse envelope.
6. Compare the ratios of the summed, squared data to detect the pulse shape at the location of the sample points. Upon successful execution of these six subtasks, control is returned to the Control Program 100 immediately after setting the two parameters (obtained from the data pair) in the Track status table portion of the computer memory.

Referring once again to FIG. 3b, the input data to the Settle subroutine 104 consists of four pairs of amplitude and phase data from each Loran pulse. The pairs of data samples are numbered 1 and 2, 3 and 4, 5 and 6, 7 and 8 in FIG. 3b, and occur on four consecutive cycles of a Loran pulse. Each pair of voltage sample points (1 and 2, 3 and 4 for example) is separated in time by 10 microseconds. Since there are eight pulses per group in Loran-C, the Settle subroutine 104 operates on two sets of 32 data points per pulse group.

The first subtask removes the pulse group phase code for all 32 pairs of input data points. After decoding, the second subtask is performed and the I (amplitude) data are compared among the pulses for a pulse-to-pulse consistency test of the amplitudes. If any data are found to be inconsistent, then all the data from the pulse associated with the inconsistent point are removed from further consideration. The amplitude data (I) from at least four pulses must be within the tolerance and consistent with respect to each other or this second subtest is deemed to have failed. Upon failure, control is returned to the Control Program 100. Upon successful completion of subtask 2, subtask 3 begins which performs the same type of comparisons and pulse rejections as subtask 2 except on quadrature data (Q) points. Only those quadrature data points are tested which are part of pulses which passed subtask 2. The same criteria for success are used as in subtask 2.

Subtask 4 consists of summing the square of the data from each of the four amplitude samples from all of the pulses that were not rejected due to inconsistencies. When all of the amplitude data have been squared and summed, subtask 5 begins, which detects the shape of the envelope of the pulse. If the envelope slope is negative, the group of Settle sample points is moved toward the leading edge of the pulse on the next data taking cycle of the Digital Measurement Unit. If the group of sample points is detected as having progressed forward of the leading edge of the pulse, the group is wholly positioned on the leading edge following the next Settle data tracking cycle. Subtask 5 is completed and subtask 6 may begin only when the whole group of sample points is located on the leading edge of the pulse. Until this goal has been achieved, Settle returns control to the Control Program after each adjustment.

Subtask 6 serves to adjust the position of the group of sample points on the pulse so that they are properly located on the first four cycles of the pulse. This is accomplished as in subtask 5 with the ratios of the summed and squared data samples determining the exact position.

The purpose of the Track subroutine 106 is to produce the best possible estimate of the time of a zero crossing at the end of the third cycle of the Loran carrier signal. To accomplish this purpose, Track moves a pair of two data sample data points, which was initially positioned by the Settle subroutine 104, forward or backward on the pulse as required until the quadrature data sample point is as close to the zero crossing as possible. The other data sample point is then used to sample the amplitude of the positive half of the fourth cycle. These points are shown as 120 and 122 in FIG. 5. In order to accomplish this purpose Track must perform the following subtasks:

1. Remove the Loran pulse group phase code.
2. Compute the predicted values of the in-phase and quadrature data sample voltages.
3. Compute the errors between the actual and predicted values of the voltages.
4. Compare these computed errors to established tolerances and reject all data from those pulses for which any error exceeds the tolerance.
5. Sum the accepted errors and count the number of accepted pulses.
6. Compute smoothed values of in-phase and quadrature voltages and voltage rates according to predetermined second order filter equations.
7. Predict the time of arrival of the zero crossing being tracked with improved resolution over that associated with the clock pulses by interpolating between the clock pulses.
8. Adjust the time position of the next set of data sample points for the next voltage measurement.
9. Set the AGC level of the RF unit of the receiver, and adjust the expected values of the data sample points for the next measurement cycle.
10. Adjust the tolerance level on errors between predicted and measured voltage samples to establish new tolerances for the next measurement cycle. Upon successful completion of these subtasks, Track returns control to the Control Program 100. Subtask 1 consists of multiplying the in-phase and quadrature data sample points by the Loran pulse group phase code, so that the effects of the phase code are removed. Subtask 2 into consideration the step in time between this pulse and the reference pulse in the previous GRI and computes the predicted values for both in-phase and quadrature voltages. In subtask 3 the errors for each component are computed, based on the new data just read in. In subtask 4 the in-phase and quadrature voltage component errors are compared to a voltage tolerance level. If either voltage component falls outside of this tolerance, the pulse is rejected. Subtask 5 sums the component errors when the I and Q component errors fall within this tolerance. In the event that subtask 4 is not successfully completed that pulse is completely rejected, subtask 5 is skipped, and data from the next pulse are processed starting with subtask 1. After all pulses in a pulse group have been processed, the smoothed values of in-phase and quadrature voltages and voltage rates are computed in subtask 6. If necessary, subtask 7 adjusts the time position of the next set of data sample points for the next voltage measurement. In subtask 8 the low pass filtered value of the in-phase voltage is tested against the automatic gain control tolerance and if necessary the RF gain is adjusted so that the in-phase data will be within this tolerance. The expected values of the data sample are adjusted accordingly in synchronism with the RF gain adjustments. If necessary, subtask 9 consists of adjusting the tolerance between computed and measured data sample voltages, according to the average number of pulses accepted.

The Station Identification subroutine 108 is to create a table of values, designated ID, which identifies the transmitting stations being tracked by the Track subroutine 106. To accomplish this the following subtasks are performed:

1. Generate a table of transmitters organized chronologically in the order of the transmitting station's reception after the reception of the reference transmitter.
2. Compute the time difference for the transmitters in the table.
3. Identify the transmitters by comparing the computed position of the receiver/navigator of the present invention based on each combination of transmitters in track taken three at a time, with the known location of the receiver/navigator.

The identities of the transmitters which satisfy these tests are stored in a table called ID. More specifically, subtask 1 begins by searching for the master transmitter in the phase codes of the transmitters in track. If a master is found to be present, a chronologically ordered transmitter table is created with the master as the first entry. If a master transmitter is not present, the phase codes of all the secondary transmitters are searched for a change of phase code. If a phase code change is found, a chronologically ordered transmitter table is created having as its first entry the first secondary transmitter which exhibits the phase code change. If neither a master transmitter nor a phase code change is detected, the first transmission received in the local GRI becomes the first entry in the chronologically ordered transmitter table. Subtask 2 consists of the computation of two time differences using the first entry in the chronologically ordered transmitter table as the reference transmitter and two other transmitters as the secondaries. Subtask 3 selects combinations of three transmitters at a time and, using the time differences computed in subtask 2, computes the present location of the receiver. The computed location is compared to the known location previously entered or updated into the computer. If the computed position of the receiver does not agree with the known location of the receiver for a given combination of three transmitters, another combination of transmitters is selected and the receiver location is recomputed for another comparison. When the two locations agree within a selected tolerance, the transmitters have then been identified and are entered into the above mentioned ID table. This procedure continues until all transmitters in Track have been identified, then control is returned to the Control Program 100.

The purpose of the Navigate subroutine 110 is to compute fixed course navigational information such as heading error, cross-track error and error rate, along-track distance to go, and along-track distance rate. To achieve this purpose the Navigate subroutine uses 13 subtasks.

1. Convert from earth orthogonal coordinates to planar coordinates for each Loran transmitter.
2. Compute the effective propagation velocity for the Loran signal.
3. Compute the geometry-dependent coordinate conversion parameters.
4. List the rate parameters for all transmitters in track.
5. Reorganize the time-of-arrival list to be relative to the reference.
6. Compute time and distance differences for all transmitters in track.
7. Convert the present receiver position from hyperbolic coordinates to Loran Rectangular Coordinates.
8. Compute and test the geometric dilution of precision (GDOP) limit to actuate baseline extension proximity warning.
9. Determine "easting" and "northing" rates and frequency offset correction.
10. Compute time differences of waypoints.
11. Compute Loran Rectangular Coordinates of waypoints.
12. Compute fixed course guidance navigational information.
13. Test for time to switch to next waypoint.

Subtask 1 sets up the triad coordinate system by finding the centroid of the location of all transmitting stations of the chain and then converting to planar coordinates centered at the centroid. Subtask 2 uses the appropriate baseline lengths between transmitters (in microseconds) and the coordinates computed in subtask 1 to compute the effective propagation velocity of the Loran signal.

Subtask 3 uses a well-known procedure to compute the geometry dependent coordinate conversion parameters. Subtask 4 computes, then lists, the rate parameters for every transmitter being tracked. Subtask 5 reorganizes the list containing the times of arrival, modulo one GRI time, so as to be relative to the reference transmitter. Note that due to the computations performed in subtask 3, the reference transmitter need not be a master transmitter. Subtask 6 then computes the time and distance differences for all transmitters in track. Subtask 7 then converts present receiver position in time difference to Loran Rectangular Coordinates. Coordinate conversion techniques typically result in two possible receiver positions, which are dependent on the sign of the square root of a quantity appearing in the computation. Selection of the proper sign of the square root to be used is based upon comparison of the three computed receiver-to-transmitter ranges with the three pre-established receiver-to-transmitter ranges. Another set of ranges is then computed for use when the Control Program 100 calls for Navigate 110 in a new triad. Subtask 8 computes the conventional GDOP determinant based on ranges, distances and the Loran Rectangular coordinates. The determinant is then tested against a limit to effect a base-line extension proximity warning. The "easting" and "northing" rates and frequency offset computations are performed in subtask 9 using previously calculated rate and geometrical parameters. Subtask 10 computes the time differences of the waypoints which are then used in subtask 11 to compute the Loran Rectangular Coordinates of the waypoints. The number of waypoints which may be utilized in the receiver/navigator of the present invention is limited only by the amount of memory storage available. In subtask 12 the direction of the fixed course and the fixed course guidance navigational information is computed. Subtask 13 tests the along-track-distance against a limit in order to begin computations on the next fixed course leg.

The purpose of the Newtrack subroutine 112 is to position the Settle data sample points, at an appropriate time position into the local GRI of a Loran transmitter which is in the current chain but is not presently being tracked. To accomplish this purpose, Newtrack computes the number of clock counts into the local GRI for each transmitter not already in track. Newtrack then re-orders the Track status table and sets the appropriate parameters so that the Settle data sample points are properly positioned. Newtrack requires only four subtasks to accomplish this purpose.

1. Determine whether a transmitter is scheduled to be transmitting.
2. Compute time of arrival of a signal at the receiver and the number of clock counts into the local GRI.
3. Determine count and phase code rollover with respect to the Loran reference transmitter.
4. Reorganize to Track status table. When these subtasks have been successfully completed control is returned to the Control.

Determination of whether a transmitter is scheduled to be transmitting as performed in subtask 1, is accomplished by checking the coding delay array for positive values. If the coding delay is positive, subtask 2 then computes the planar coordinates of the transmitter, the time of arrival of the Loran signal from that transmitter to the receiver, and the number of clock counts into the local GRI for that transmitter. Subtask 3 then tests the clock count number for rollover, modulo the count per GRI. If rollover has occurred, the count for that transmitter is decreased by the count per GRI, and the phase code is increased by 16. The phase code is then tested for rollover and decreased by 32 if rollover has occurred. When the computed count for this transmitter differs by more than 200 microseconds from all the others in the table the Track status table is reorganized by subtask 4. In other words, the values for each entry in the table are remembered in time and moved upward until the proper slot is created for the new transmitter. When all transmitters have been processed control is returned to the control program.

Figure 6:
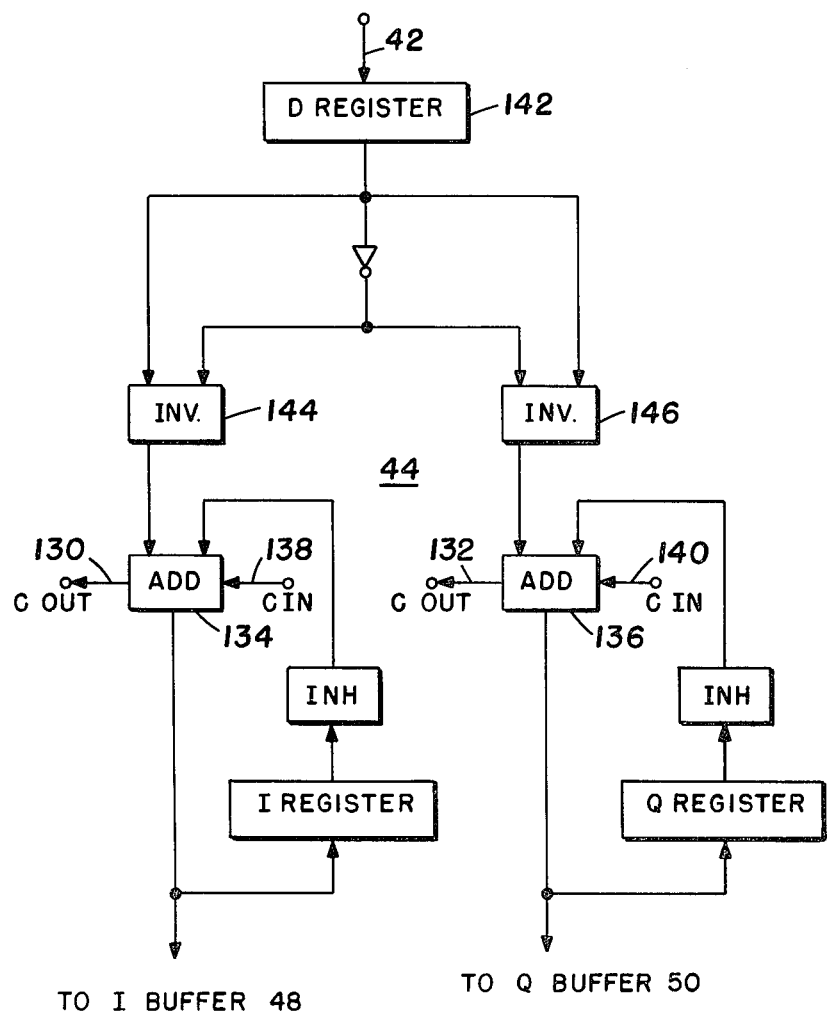
FIG. 6 is a block diagram of a portion of the measurement processor of the preferred embodiment.

Referring now to FIG. 6, a portion of the measurement processor, 44 of FIG. 1, is shown in more detail. This processor is a 16-bit parallel processor, but since no shift operations are required, the logic for 1 bit position will define the logic for the remaining 15 bits. The only linkage between bits is the carry output (C out), shown on line 130 for the I component and on 132 for the Q component, of each adder bit position. Each adder, 134 for I and 136 for Q, is connected to receive the carry input (C in) on lines 138 and 140 from the next higher order bit position, that is, the carry output of the highest bit position is used. The carry input of the lowest bit position is raised when the analog-to-digital converter output signal on line 42 is fed to a D register 142 whose output signal is inverted in inverters 144 and 146 and is passed through adders 134 and 136 to form the two's compliment of the contents of the D register 142. Separate adders 134 and 136 are used for the I and Q processors to minimize sequence control logic complexity.

Referring to FIG. 7, the measurement sequence generator 52 of FIG. 1, is shown in more detail. The main component of the measurement sequence generator 52 is a read only memory 160, which in this preferred embodiment is 256 words by 8 bits. The read only memory 160 is used as the microprogram controller for the measurement processor 44 and the I and Q buffers 48 and 50, shown in FIG. 1, control instructions are outputted on the lines shown at 162. The mode control file 62 of FIG. 1 supplies the address inputs shown at 164 to the read only memory 160. These four inputs at 164 are the mode control words which define the type of measurement mode. The two inputs at 166 are the outputs from the synchronous preset counter 68 of FIG. 1, which define the four possible sample points in one cycle of the Loran signal. The remaining two address inputs 168 and 170 to the read only memory 160 represent first cycle 168 and last cycle 170. These are required since the control sequence for a measurement may be different for the first cycle than for intermediate cycles or the last cycle. If the measurement sequence only occurs over one cycle the first and last cycles will be the same. The read only memory 160 is enabled by a signal on line 172, which is the logic OR function from device 174. The inputs to the OR device 174 are the first cycle signal 168, the last cycle signal 170 and a run flip/flop signal on line 176. The first cycle signal on line 168 may be generated by a start comparator 178, which may be a gated 4-bit comparator, which is enabled by a signal on line 180 from a logical AND device 182 having as input the last three stage outputs 166 of the synchronous preset counter 68 of FIG. 1. The next four stages of the synchronous preset counter 68 supply the four inputs on lines 166 to the comparator 178. The mode control file 62 of FIG. 1 supplies the other four inputs, shown generally at 184. This arrangement permits the first cycle signal to be generated under control of the mode control word at from one to sixteen cycles before the end of the measurement cycle. The number of cycles before the end of the measurement interval cannot be made longer than the number of cycles in the measurement interval.

The first cycle signal on line 168 is also used to Set the run flip/flop 186. The run flip/flop 186 is Reset by the last cycle signal on line 170. The last cycle signal is generated by a logical AND device 188 having as inputs four stages of the synchronous preset counter 68.

Figure 8:
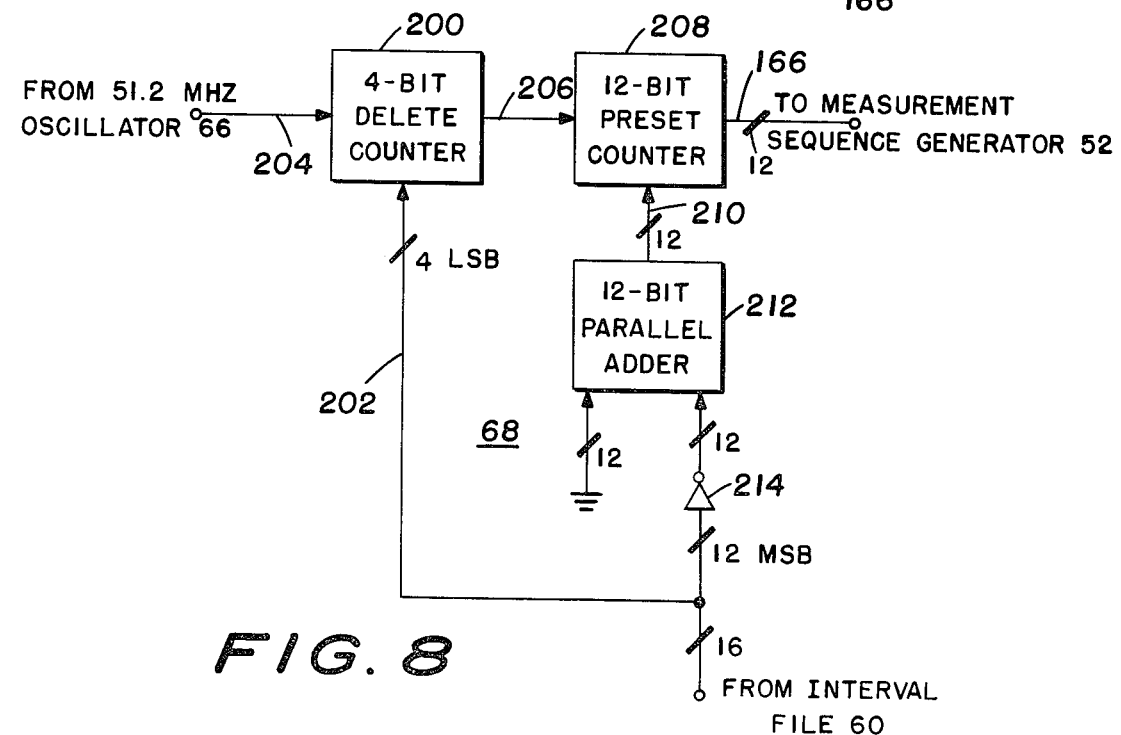
FIG. 8 is a block diagram of the synchronous preset counter of the preferred embodiment.

Referring to FIG. 8, the synchronous preset counter 68 of FIG. 1, is shown in more detail. The synchronous preset counter is a 16-bit device and is divided in three main sections, which serve to transfer the interval word from the interval file 60 into the synchronous preset counter. The first section 200 comprises four high speed stages parallel accept paralle input data on line 202 and which operate by count deletion. Also input to the first four stages 200 of the synchronous preset counter 68 is the 51.2 MHz oscillator signal on line 204. The output of this 4-bit delete counter 200 is a 3.2 MHz signal on line 206 which is fed to the 12 lower speed stages 208. These remaining 12 stages 208 of the synchronous preset counter 68 are constructed from three synchronous 4-bit counters. These three circuits form a 12 stage synchronous binary up-counter with 12 individual stage outputs on line 166, 12 parallel data inputs on line 210 and the 3.2 MHz signal on line 206. The transfer logic is provided by 12-bit parallel adder 212 and 12 inverters 214. Since the deletion method employed in the first four high speed stages 200 amounts to direct subtraction, the four least significant bits of the interval word need not be complemented. The resultant transfer logic then consists of the 12-bit parallel adder 212 and the 12 inverters 214 operating with the high speed delete counter 200 and the low speed preset counter 208. The twelve inverters 214 serve to complement the 12 most significant bits of the interval word while the parallel adder 212 with the raised carry input adds 16 counts to the complement interval number.

Various other modifications, adaptations and alternations are of course possible in light of the above teachings. Therefore, it should be understood at this time that within the scope of the appended claims the invention may be practiced otherwise than as specifically described.

What is claimed is:

1. Apparatus for producing navigation information from the coded signals of an existing network of radio transmitting stations each of which transmits a navigation signal in the form of a pulse group distinctively coded in accordance with the identity of that transmitting station, said apparatus comprising:

receiver means for receiving said transmitted coded navigation signals, measuring means having search, settle, and track modes connected to said receiver means for making measurements at selected points on the waveform of each of said received coded signals and producing output signals representing the signal in-phase and quadrature amplitudes at said selected points on said signal waveform, said search mode involving the use of said measurements of said waveform to identify a group of said transmitting stations, said settle mode involving the use of said measurements of said waveform to locate a track point on the waveform for the received signal from each transmitting station of said station group, said track mode involving the use of said measurements to adjust the location of said track point on the waveform of said received signal from each transmitting station of said station group, to maintain said track point coincident with the point at which said quadrature amplitude is measured, only if said quadrature amplitude remains within a preselected tolerance between successive pulses of a pulse group, control means responsive to said output signals from said measuring means for selectively switching said measuring means to its search, settle, and track modes, and means rendered effective when said measuring means is in its track mode for generating from the output signals from said measuring means data demarcating the times of arrival of said coded signals for navigation purposes.

2. The navigation apparatus specified in claim 1 further including means responsive to the average number of times said quadrature amplitude falls within said preselected tolerance during a predetermined time interval for subsequently adapting said preselected tolerance for said quadrature amplitude dependent upon the existing environment through which said coded navigation signals are transmitted.

3. The navigation apparatus specified in claim 1 wherein said track mode involves adjustment of the location of said track point on the waveform of said received signal from each transmitting station of said station group, to maintain said track point coincident with the point at which said quadrature amplitude is measured, only if both said in-phase and said quadrature amplitudes fall within the same preselected tolerance.

4. Apparatus for producing navigation information from the coded signals of existing network of radio transmitting stations each of which transmits a navigation signal in the form of a pulse group distinctively coded in accordance with the identity of that transmitting station, said apparatus comprising:

receiver means for receiving said transmitted coded navigation signals, measuring means having search, settle, and track modes connected to said receiver means for making measurements at selected points on the waveform of each of said received coded signals and producing output signals representing the signal in-phase and quadrature amplitudes at said selected points on said signal waveform, said search mode involving the use of said measurements of said waveform to identify a group of said transmitting stations, said settle mode involving the use of said measurements of said waveform to locate a track point on the waveform for the received signal from each transmitting station of said station group, said track mode involving adjustment of the location of said track point on the waveform of said received signal from each transmitting station of said station group, to maintain said track point coincident with the point at which said quadrature amplitude is measured, only if said in-phase amplitude remains within a preselected tolerance between successive pulses of a pulse group, control means responsive to said output signals from said measuring means for selectively switching said measuring means to its search, settle, and track modes, and means rendered effective when said measuring means is in its track mode for generating from the output signals from said measuring means data demarcating the times of arrival of said coded signals for navigation purposes.

5. The apparatus specified in claim 3 wherein said search mode employs a test internal to a pulse group requiring that a preselected number of pulses of said pulse group be consistent with one another within a preselected tolerance, and said settle mode employs a test using only those in-phase and quadrature amplitudes which fall within a preselected tolerance.

6. The apparatus specified in claim 5 wherein the preselected tolerance becomes increasingly more stringent as said measurement means is switched successively from its search mode to its settle mode and from its settle mode to its track mode.

7. Apparatus for producing navigation information from the coded signals of an existing network of master and slave Loran transmitting stations each of which transmits a navigation signal in the form of a pulse group distinctively phase coded in accordance with the identity of that transmitting station, said apparatus comprising:

receiver means for receiving said transmitted coded navigation signals, measuring means having search, settle, and track modes connected to said receiver means for making measurements at selected points on the waveform of each of said received coded signals and producing output signals representing the signal amplitude at said selected points on said signal waveform, said search mode involving the use of said measurements of said waveform to identify a group of Loran transmitting stations, said settle mode involving the use of said measurements of said waveform to locate a track point on the waveform of the received signal from each Loran transmitting station of said station group, said track mode involving the use of said measurements to adjust the location of said track point on the waveform of said received signal from each Loran transmitting station of said station group, to maintain said track point coincident with a preselected point on said waveform provided the signal magnitude at said preselected point remains within a predetermined tolerance, control means responsive to said output signals from said measuring means for selectively switching said measuring means to its search, settle, and track modes, means rendered effective when said measuring means is in its track mode for generating from the output signals from said measuring means data demarcating the times for navigation purposes, means responsive to the times of arrival demarcating output data from said generating means for establishing a station identity file listing in chronological order commencing with a selected reference Loran transmitting station the identity of the Loran transmitting stations from which coded signal have been received and tracked, and means for selecting any pair of Loran stations from said station identity file for generating data indicating the difference in times of arrival of said coded signals from said selected pair of Loran stations relative to the coded signals from said selected reference Loran station.

8. The apparatus specified in claim 7 wherein said station identity file establishing means selects said reference Loran transmitting station using the following criteria:

1. a master Loran station is used as said reference station if signals therefrom are being received and tracked, 2. if a master Loran station is not being tracked, a slave Loran station is used as said reference station if the coded signals therefrom indicate that a phase code change has been detected in said coded signals, and 3. if neither a master Loran station is being tracked or a phase code change has been detected in the coded signal from a slave Loran station, the slave Loran station from which coded signals are first received is used as said reference station.

9. The apparatus specified in claim 7 wherein the said track point on the waveform of said received signal is adjusted into coincidence with the point at which the quadrature amplitude of said received signal is measured only if said quadrature amplitude falls within a predetermined tolerance.

10. The apparatus specified in claim 9 further including means responsive to the average number of times said quadrature amplitude falls within said preselected tolerance during a predetermined time interval for subsequently adapting said preselected tolerance for said quadrature amplitude dependent upon the existing environment through which said coded navigation signals are transmitted.

11. The apparatus of claim 1, wherein said transmitted coded navigation signals are in the form of Loran pulse groups phase coded in accordance with the identity of the associated Loran transmitting station and wherein said control means responsive to said output signals from said measuring means for selectively switching said measuring means to its search, settle and track modes comprises in said search mode:
  means responsive to said output signals for detecting a Loran pulse contained in said output signals,
  means responsive to the number of said detected pulses for detecting a group of Loran pulses,
  means responsive to said detected Loran pulse group for identifying the phase code of said detected Loran pulse group, and
  means responsive to said identified phase code for storing the in-phase and quadrature amplitudes of said signal waveform at said selected points for each Loran pulse within said detected pulse group.

12. The apparatus of claim 11 wherein said control means responsive to said output signals from said measuring means for selectively switching said measuring means comprises in said settle mode:
  means responsive to said output signals for removing said phase code from said coded signals to produce uncoded Loran pulses,
  means responsive to said uncoded signals for detecting whether the in-phase and quadrature amplitudes of each of said uncoded Loran pulse is consistent within a preselected tolerance throughout the detected Loran pulse group,
  means rendered effective when Loran pulses of consistent in-phase and quadrature amplitudes are detected throughout the detected Loran pulse group for detecting the shape of the envelope of a Loran pulse to demarcate the leading edge of the Loran pulse envelope, and
  means rendered effective when said leading edge has been demarcated for positioning the selected points at which said measurement means measures in-phase and quadrature amplitudes relative to said leading edge for the purpose of locating a desired track point on each detected Loran pulse.

13. The apparatus of claim 12 wherein said control means responsive to said output signals from said measuring means for selectively switching said measuring means comprises in said track mode:
  means responsive to said output signals for detecting whether the in-phase and quadrature amplitudes of said signals remain within a selected tolerance, and
  means for adjusting the location of said track point on each of said detected Loran pulses into coincidence with the point at which said quadrature amplitude is measured only if both said in-phase and quadrature amplitudes fall within said selected tolerance.

14. The apparatus of claim 13 wherein said receiver means includes means for removing interference from said received coded navigation signals.

15. The apparatus of claim 13 wherein said control means is a programmed general purpose computer.

* * * * *